March 20, 1928. 1,662,928
C. W. KIRSCH
COMPOSITE DRAPERY SUSPENSION FIXTURE
Filed Jan. 24, 1927 5 Sheets-Sheet 1
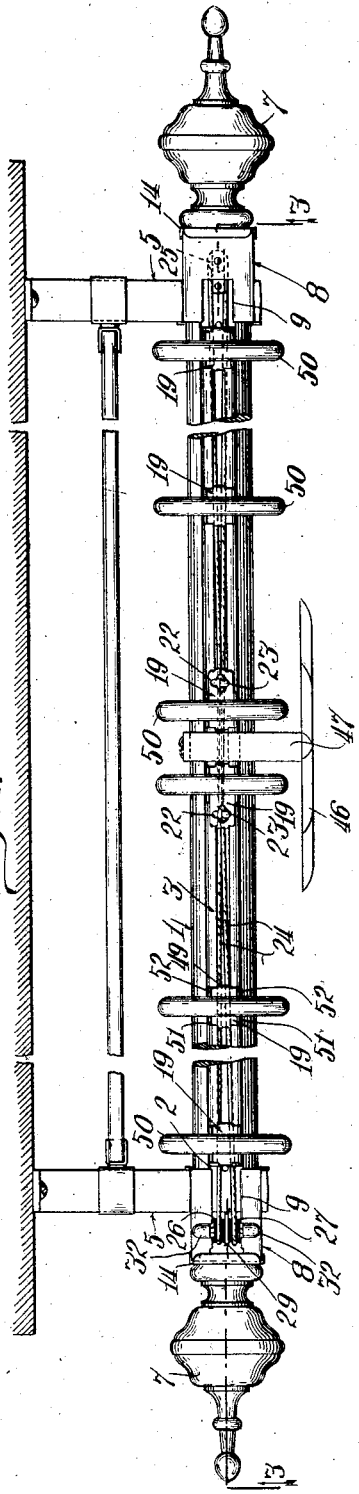
Inventor
Charles W. Kirsch
By Rudolph M. Loe
Attorney.

March 20, 1928.
C. W. KIRSCH
1,662,928
COMPOSITE DRAPERY SUSPENSION FIXTURE
Filed Jan. 24, 1927    5 Sheets-Sheet 2
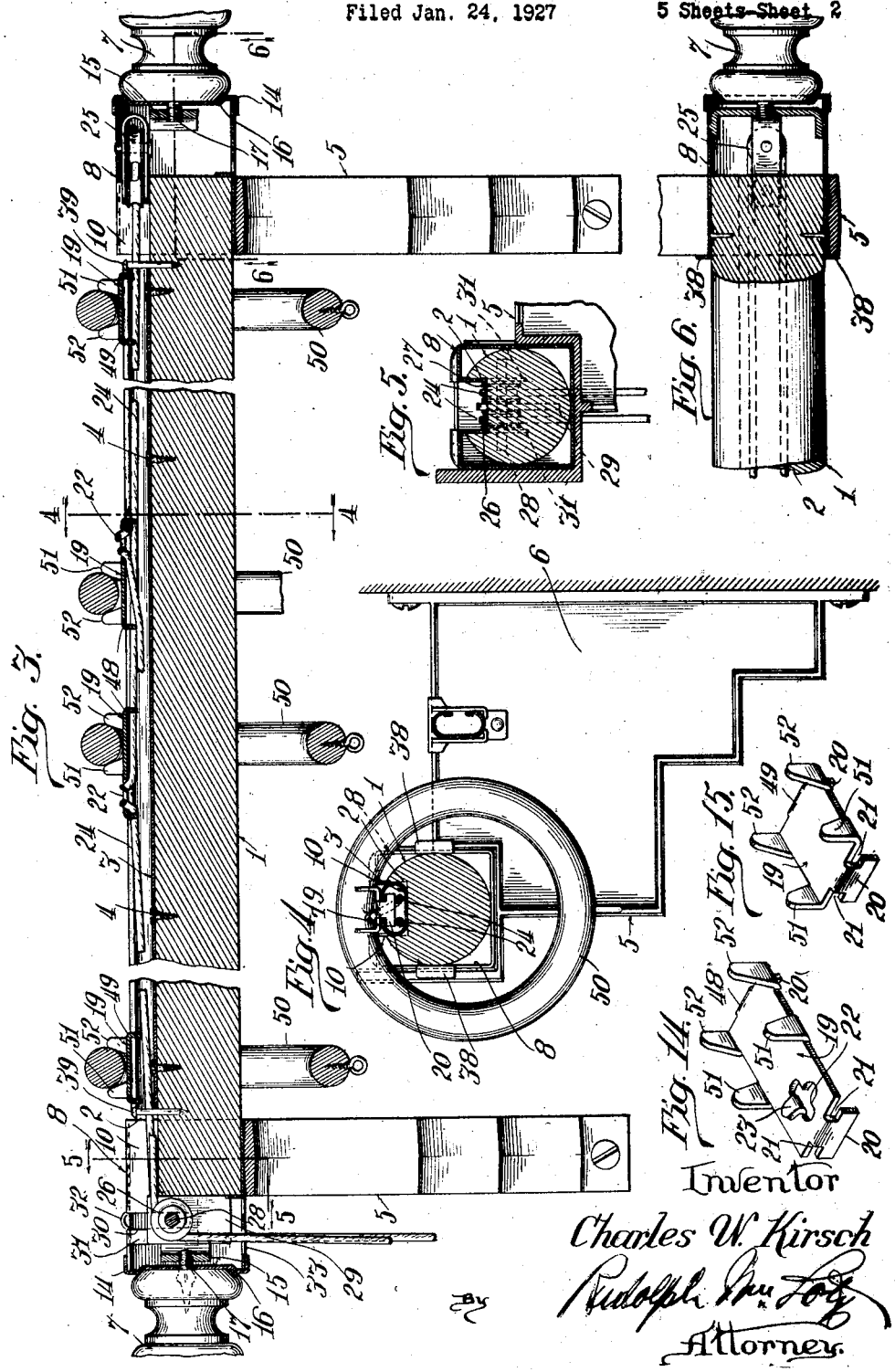
Inventor
Charles W. Kirsch
By Rudolph Wm Lotz
Attorney March 20, 1928.  
C. W. KIRSCH  
COMPOSITE DRAPERY SUSPENSION FIXTURE  
Filed Jan. 24, 1927
1,662,928
5 Sheets-Sheet 3
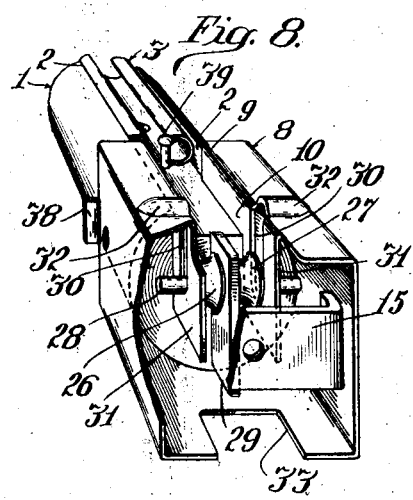
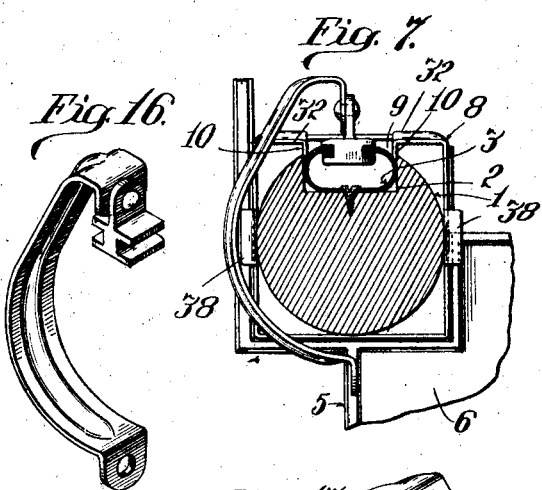
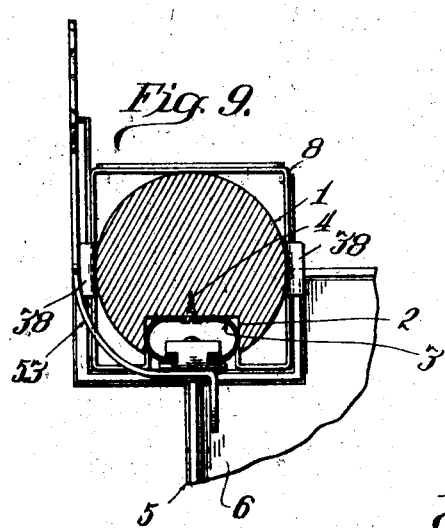
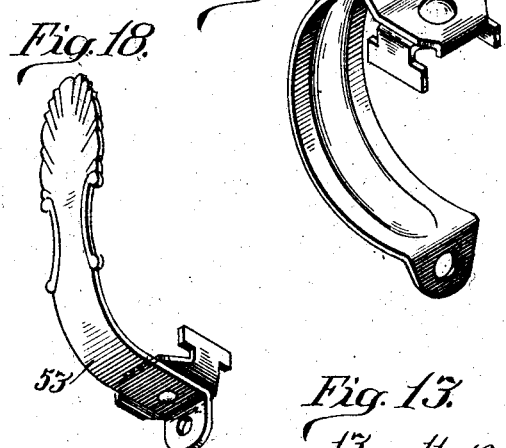
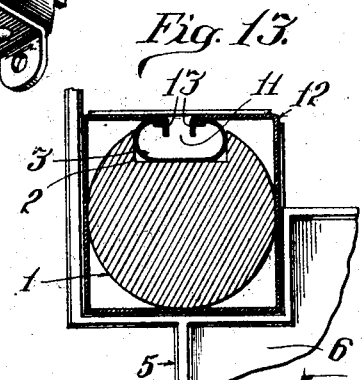
Inventor  
Charles W. Kirsch

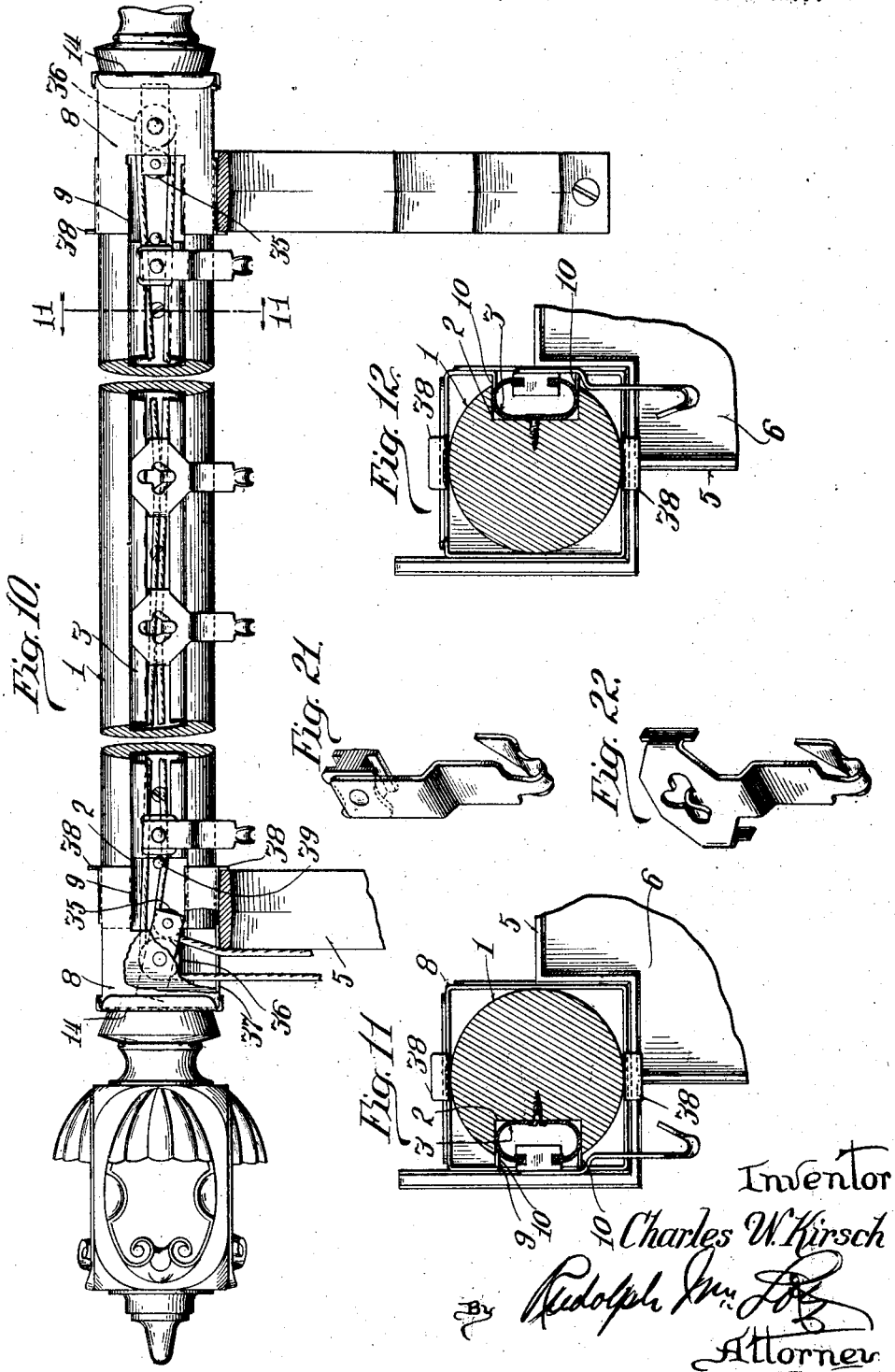

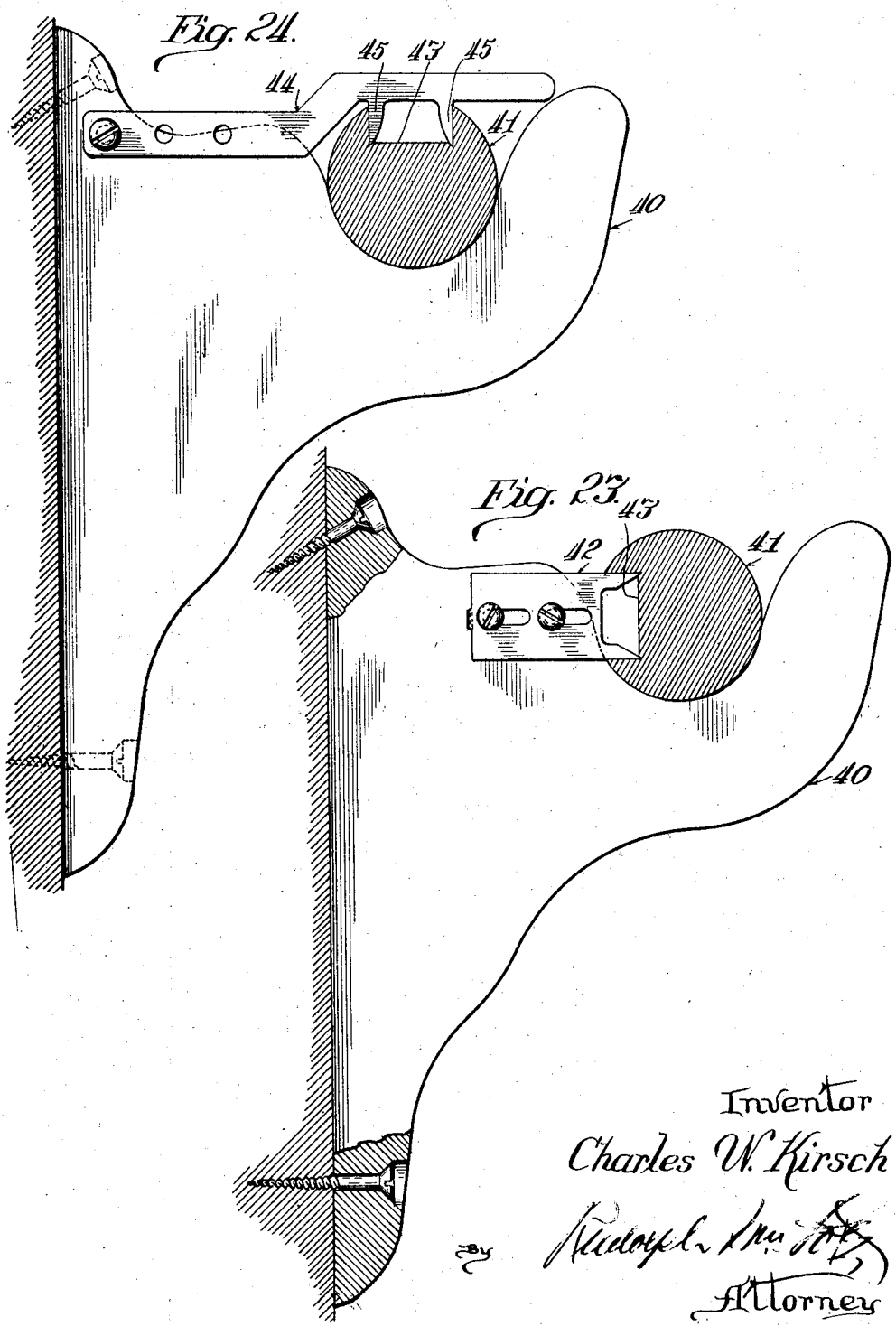

Patented Mar. 20, 1928.

1,662,928

UNITED STATES PATENT OFFICE.

CHARLES W. KIRSCH, OF STURGIS, MICHIGAN, ASSIGNOR TO KIRSCH MANUFACTURING COMPANY, OF STURGIS, MICHIGAN, A CORPORATION OF MICHIGAN.

COMPOSITE DRAPERY-SUSPENSION FIXTURE.

Application filed January 24, 1927. Serial No. 162,990.

This invention relates to improvements in drapery suspension fixtures and more particularly to that type of fixture of this nature which includes a rod or pole of relatively large diameter such as are commonly made of wood and, in many instances, provided with surface ornamentation, rendering them either rough so that drapery carrying rings and the like will not readily slide upon the same, or so delicate with respect to the wearing off of the surface finish by friction as to render them unsatisfactory.

These curtain poles are usually cylindrical or substantially cylindrical and whether provided with surface ornamentation such as carving or the like, or are smooth, they are usually rotatable relatively to their supporting brackets unless fastened in the same, by means of a brad or screw, to render them non-rotatable therein. The rings usually slidable on said poles are also, in many instances, ornamented in harmony with the pole and, for purposes of securing easy travel of the said rings on the pole both the latter and the rings must be in part rendered smooth, said smooth portions being necessarily disposed in opposed relation or contact and any rotation of the pole relatively to its supporting brackets serves to change the relation of these smooth portions and thus defeat easy travel of the rings on the pole and cause injury to the intended visible portions of the pole when in normal position. This expedient of rendering the opposed contacting surfaces of the pole and rings smooth has, however, proved unsatisfactory, for the reason that friction of a very appreciable degree is not thereby overcome and causes the rings to swing on their vertical axes of suspension during manipulation and thus cause wear on the pole surfaces at front and rear of the latter.

These several difficulties have proved detrimental to the use of the wood poles which, in many instances, are best adapted to obtain the most artistic effects at least cost.

The general object of the present invention is to provide a large diameter pole made of any desired material adapted to purposes of surface ornamentation which may be furnished to interior decorators and drapery shops in long lengths for cutting into requisite shorter lengths and pieces for assembly in conjunction with metallic elements or hardware to produce complete poles or drapery fixtures which, while presenting all of the desired ornamental characteristics incident to such poles, also present all of the mechanical advantages incident to the metallic drapery fixtures which have practically supplanted the wood poles, the present invention consisting in combining the wood or other material of the pole with metallic fixtures in various interchangeable ways to suit every requirement of the decorator or designer of the drapery equipment.

The specific objects of the present invention will be readily understood from or pointed out in the following specification.

The invention is fully illustrated in the accompanying drawings wherein:

Fig. 1 is a top plan view of a drapery fixture constructed in accordance with the invention.

Fig. 2 is a front elevation of the same.

Fig. 3 is a vertical section of the same on the line 3—3 of Fig. 1.

Figs. 4 and 5 are sections on the lines 4—4 and 5—5, respectively of Fig. 3.

Fig. 6 is a fragmentary plan section on the line 6—6 of Fig. 3.

Fig. 7 is a section similar to Fig. 4 showing a different type of drapery carrier employed.

Fig. 8 is a perspective view, partly broken away, illustrating a sleeve associated with the curtain pole and bracket.

Fig. 9 is a sectional view similar to Fig. 7, but showing the curtain pole in reverse of the position shown in Fig. 7.

Fig. 10 is a front elevation, the brackets being shown in section, showing the curtain pole disposed in a different position from that of Fig. 1.

Fig. 11 is a section on the line 11—11 of Fig. 10.

Fig. 12 is a view similar to Fig. 11, showing the curtain pole in reverse position from that shown in Fig. 10.

Fig. 13 is a sectional view similar to Fig. 5, but illustrating a modified form of construction.

Figs. 14 to 22, inclusive, are perspective views of the several kinds of drapery carriers which may be interchangeably used in connection with the curtain pole.

Figs. 23 and 24 are views in side elevations of an ordinary curtain pole bracket equipped with pole and pole engaging devices embodying the present invention in a different or modified form.

The present invention embodies the substance of the disclosure of Letters Patent No. 1,494,428, dated May 20, 1924, in so far as the present structure includes a curtain rod of the type shown in said Letters Patent and also the type of drapery carriers therein shown, the carriers of the present structure being merely shaped to avoid contact with the surface of the curtain pole.

The curtain pole 1 of the present structure is shown as composed of a solid material, such as wood, and is also illustrated as being cylindrical and of smooth exterior as a matter of convenience only.

The pole 1 is provided with a continuous longitudinal groove 2 and is furnished to the dealer in long lengths which may be cut to suit the various needs of purchasers, to thereby avoid waste as far as possible. The groove 2 is of depth and width to snugly receive the curtain rod 3 of C-shaped cross-section which is also furnished to the dealer in long lengths for cutting as required. The rod 3 is perforated for the passage of the screws 4.

The complete fixture includes a pair of supporting brackets 5 each provided with a rectangular pocket to receive the pole, these brackets being otherwise of any desired shape and provided with recesses 6 in one or both sides for the insertion of ornamental panels or the like.

The curtain pole 1 must be non-rotatable relatively to the brackets 5 in order that the curtain rod 3 thereof may be maintained in any one of the four different positions, relatively to said brackets, which are illustrated in the drawings and, as it is very desirable that the pole 1 be equipped with ornamental end members 7, I provide the ends of the pole 1 with cap members 8 of square cross-section which telescopically receive the said ends of the pole 1.

The said cap members 8 are made of sheet metal and each is provided in one wall thereof with a slot 9 extending to the end of said wall which overlaps the pole 1. The said slot 9 is bordered by the parallel flanges 10 which, as shown most clearly in Figs. 3 and 5, snugly engage the side walls of the groove 2 of the pole 1 and thus prevent the latter from rotating relatively to said cap member 8. This particular arrangement may, however, be advantageously modified by providing a narrower slot 11 in the cap member 12 shown in Fig. 13 and having the flanges 13 bordering the said slot engage the opposed walls of the slot in the rod 3 mounted in the groove 2 of the pole 1. This modification is advantageous, because if the pole 1 be of wood it is subject to swelling and shrinking under varying weather conditions, whereas the rod 3 is not, and, further, because the flanges 13 of this modified structure will constitute stops to prevent the drapery carriers from passing out of the ends of the rod 3, this advantage being more apparent from following portions of this specification.

The cap member 8 includes the sleeve-like body portion and a removable cap 14 having a central opening. Within said body portion there is mounted a U-shaped yoke 15 the middle portion of which is disposed parallel with, but spaced from the cap 14, the end wall or head of which is provided with a central circular dished portion 16. The yoke is provided with a threaded opening disposed in axial alignment with the central opening in the cap 14 to engage the central threaded projection 17 of the end member 7 of the pole 1 which, in the instance illustrated, consists of an ornamental member. As the cap 14 of the member 8 is elastic, the spacing thereof from the middle portion of the member or yoke 15 permits the threaded projection 17 to be entered to whatever extent is necessary, to very firmly secure the member 7 and, in the event that the latter is of polygonal cross-section, adjust its position relatively to the pole as desired without undue strain on the threads while still maintaining a frictional resistance to reverse or releasing rotation to prevent the latter by ordinary vibration.

The rod 3 is adapted to receive drapery carriers of the various types shown in Figs. 14 to 22 inclusive, each of said types including a base element 19 comprising a flat plate having end flanges 20, the latter being provided in their side edges with recesses 21 to receive the opposed walls of the slot in the rod 3. Each set of said carriers includes two master-carriers which are distinguishable from the others in that they are equipped with means such as the slots 22 and projections 23 to engage a draw-cord 24 between the ends of the latter, this type of carrier being disclosed in Letters Patent No. 1,494,428, dated May 20, 1924, and No. 1,494,429, of the same date, and constituting, per se, no part of the present invention.

The draw-cord 24 is trained over a sheave 25 in one of the members 8 and over the sheaves 26 and 27 in the other thereof, the sheave 25 being rotatable on an axis perpendicular to the axis common to the sheaves 26 and 27 and disposed in alignment with the hollow of the rod 3. The sheaves 26 and 27 are mounted on a shaft 28 which is rigid with the plate 29 disposed between said sheaves, the end portions of said shaft 28 projecting through slots 30 in plates 31 which are flush with the flanges 10 and extend considerably farther inwardly of the member 8 than do said flanges 10. The wall portions of the member 8 opposing the ends of the slots 30 are formed to provide substantially semi-cylindrical members 32 which receive the projecting ends of the shaft 28 when the member 8 is disposed in inverted position relatively to that shown in Fig. 8, the said slots and formations 32 co-operating to cause the uppermost portions of the grooves in the sheaves 26 and 27 to become substantially axially aligned with the hollow of the rod 3 in the respective portions of the member 8, and pole 1, shown in Fig. 8 and Fig. 9, respectively, the top and bottom walls of the member 8 being provided with openings 33 for the passage of the depending ends of the draw-cord 24.

It will be understood, of course, that each pole 1 will be equipped with a member 8 containing the single sheave 25 and a member 8 containing the pair of shiftable sheaves 26 and 27 if said pole 1 is to be positioned with the rod 3 at top or bottom, as shown in Figs. 8 and 9. But if the said pole 1 is to be positioned so that the rod 3 is disposed either at front or rear thereof, then a pair of members 8 such as are shown in Fig. 10 must be used. The latter differ from the members 8 previously described, in that they are provided with carriers 34 for the sheaves 35 and 36, the said carriers being pivotally mounted on a side wall of the member 8 on an axis coincident with that of the larger sheave 36. The inner ends of the carriers 34 project into the groove 2 of the pole 1, so that the side walls of the latter (which become top and bottom walls thereof when the pole 1 is positioned as shown in Figs. 10, 11 and 12) serve as stops to limit the pivotal movement of said carriers and serve to maintain the upper portion of the groove of the sheave 35 of one of said carriers properly positioned with respect to that of the sheave 36 of the same when the draw-cord 24 is trained over both said sheaves, as shown at the left-hand end of the pole 1 of Fig. 10. The cord 24 is trained only over the sheave 36 of the carrier at the other end of said pole 1. The members 8 are provided in their top and bottom walls with openings 37 for the passage of the depending end portions of said draw-cord 24.

In the several types of members 8 shown, some of the walls are equipped with the stop flanges or formations 38 for engaging the opposed edges of one or more of the the three walls of the brackets bordering the recess in which the member 8 fits, to thereby prevent longitudinal movement of the pole 1 relatively to the said brackets.

It will be noted that in the structures illustrated (except Fig. 13) the rod 3 is shorter than the pole 1 and is so disposed in the groove 2 of the latter that the ends of said rod will form stops for engagement by the ends of flanges 10 of the members 8 to limit the extent of projection of the pole ends into said members. It will also be observed that a brad 39 is driven into the bottom of the groove 2, at either end of the rod 3, to provide stop formations to prevent the drapery carriers from being forced out of the open ends of the rod by pull on one of the end portions of the cord 24. In the structure illustrated in Fig. 13 the flanges 13 perform the function of the brads 39 and permit of the use of rods 3 coinciding in length with the pole 1, the members 8 in such case being necessarily provided with internal stop formations to limit projection thereinto of the pole ends, but these formations are not shown as being quite unnecessary for the instruction of those to whom this specification is addressed.

In Figs. 23 and 24 I have illustrated a type of bracket commonly used to support the large diameter curtain poles, these brackets being also generally made of wood. The recesses in these brackets 40 have semi-cylindrical bottoms and permit rotation of the poles 41 therein. To prevent this the bracket 40 is equipped with either a slidable member 42 which may be projected into the groove 43 of the pole when the latter is disposed with said groove at the rear, or with a pivoted member 44 having projections 45 to engage in said groove when the latter is disposed at the top of the pole, these respective positions of the groove being necessarily, the more popular and common, because rendering the groove and curtain rod therein invisible from the ordinary points of observation.

When using brackets of the type shown in Figs. 23 and 24, the groove of the pole may be conveniently equipped with a curtain rod and sheave carrying end members therefor, such as are illustrated and described in Letters Patent No. 1,606,581, dated Nov. 9, 1926, and the pole per se provided with an opening or recess properly positioned for the passage of the depending end portions of draw-cord, it being obvious that said end members must be slightly modified to adapt them to this use. The type of sheave carriers illustrated and described in Letters Patent No. 1,606,582, dated Nov. 9, 1926, modified to adapt the same for such use, may also be employed, the suggested modifications being easily within the skill of the mechanic versed in this art and requiring no special illustration or description herein.

In connection with curtain fixtures, it is now quite customary to use ornaments which, preferably, are secured directly to the curtain pole. An example of such an ornament is illustrated in Figs. 1 and 2 and consists of the member 46 equipped with an arm 47 secured to the rearmost part of the pole 1 midway between the ends thereof, the point of attachment being obviously selective according to the position of the curtain rod 3 and the said arm 47 arranged to obviate interference with the operation of the drapery carriers.

In Figs. 14 to 22 inclusive, I have illustrated the various kinds of drapery carriers which may be selectively employed according to the position of the curtain rod 3.

If, as shown in Figs. 1 and 2, the rod 3 is disposed at the top of the pole 1, the slides 48 and 49, of Figs. 14 and 15, are employed only in the event that rings 50 of the conventional type or of special design are to be employed, said slides 48 and 49 being provided with the pairs of upwardly extending projections 51 and 52 to form what I term saddles to receive the rings 50 and maintain the same properly positioned relatively to the pole 1 and also out of surface contact with the latter.

In place of the said slides of Figs. 14 and 15, either of the types shown in Figs. 16 and 17 may be used either in the form shown or any suitable modification thereof to render them graceful and ornamental in appearance.

If, as shown in Fig. 9, the curtain rod 3 is disposed at the bottom of the pole, the slides shown in Figs. 18, 19 or 20 may be employed, the member 53 of Fig. 18, constituting an ornament which performs no function.

If, as shown in Figs. 11 and 12, the curtain rod 3 is disposed at either the front or the rear of the pole, the type of slide shown in Figs. 21 and 22 will be employed, it being obvious that said slides may carry ornaments or may be rendered ornamental if desired.

Each set of slides or drapery carriers used must, in the event that the draw-cord 24 is employed, include a pair of master slides to support the meeting edge portions of the draperies.

From the foregoing specification it will be obvious that my invention is embodied in a composite structure which is made up of a variety of interchangeable parts to adapt the same to practically every need of the decorator. This interchangeability is very desirable, for the reason that it enables the dealer to select from a comparatively small stock of parts those which are necessary to make up the complete fixtures in accordance with his taste or the specification covering the installation. It will also be noted that the assembly of the complete fixtures involves little or no accurate work or highly skilled labor and the securing of these several advantages constitutes a very important object of the invention.

I claim as my invention:

1. A curtain or drapery supporting fixture including a pair of supporting brackets, a curtain pole supported by said brackets and having a continuous longitudinal groove therein, a hollow slotted curtain rod mounted in said groove, drapery carriers slidably associated with the walls of the slot of said rod, a draw-cord associated with said carriers and disposed within said rod, sleeves for engagement by said brackets telescopically mounted adjacent the ends of the pole and engaged with the groove therein for preventing rotation of said sleeves relatively to the pole, sheaves for said draw-cord carried by said sleeves, the latter and co-operating portions of said brackets shaped to prevent rotation of said sleeves relatively to said brackets.

2. A curtain or drapery supporting fixture including a pair of supporting brackets, a substantially cylindrical curtain pole having a continuous longitudinal groove, sleeves of polygonal cross-section telescopically mounted adjacent the ends of said pole and engaged with the groove therein for preventing rotation of said pole relative to said sleeves, said brackets having formations for engaging said sleeves against rotation relatively to the said brackets.

3. A curtain or drapery supporting fixture including a pair of supporting brackets, a substantially cylindrical curtain pole having a continuous longitudinal groove, sleeves of polygonal cross-section telescopically mounted adjacent the ends of said pole and engaged with the groove therein for preventing rotation of said pole relatively to said sleeves, said brackets having formations for engaging said sleeves against rotation relatively to the said brackets, a hollow longitudinally slotted curtain rod mounted in said groove of said pole, drapery carriers slidably mounted on the walls of said rod bordering the said slot, a draw-cord for said carriers disposed within the rod, and sheaves carried by said sleeves over which said draw-cord is trained.

4. A curtain or drapery supporting fixture including a pair of supporting brackets, a substantially cylindrical curtain pole having a continuous longitudinal groove, sleeves of polygonal cross-section telescopically mounted adjacent the ends of said pole and engaged with the groove therein for preventing rotation of said pole relatively to said sleeves, said brackets having formations for engaging said sleeves against rotation relatively to the said brackets, a yoke within each of said sleeves, end walls for the latter spaced from said yokes, the latter and said end walls having aligned central openings, the opening in said yoke threaded, and end members for said pole having axially disposed threaded projections for passage through the central openings in said endwalls and engagement in the threaded openings of said yoke.

5. In a drapery fixture, a curtain pole equipped at its ends with sleeves non-rotatably engaged therewith and having flexible outer end walls provided with central openings, yokes within said sleeves having threaded openings axially aligned with the openings in said end walls, said yokes spaced from the latter, and end members for said pole provided with axial threaded projections for passage through the openings in said end walls and engagement in the threaded openings in said yokes.

6. In a drapery fixture, a pair of supporting brackets, a substantially cylindrical curtain pole having a continuous longitudinal groove, a hollow slotted curtain rod mounted in said groove, drapery carriers and a draw-cord therefor associated with said rod, polygonal sleeves telescopically mounted on the ends of the pole and engaged with said grooves for holding them against rotation relatively to said pole, said sleeves adapted to be non-rotatably engaged with said brackets, in positions varying the position of the said rod, sheave carriers movably mounted in at least one of said sleeves, and sheaves over which the said draw-cord is trained mounted in said carriers, said sheaves being varied in position to accord with the variance in position of the curtain rods relatively to the brackets.

7. In a drapery fixture, a pair of supporting brackets, a substantially cylindrical curtain pole having a continuous longiudinal groove, a hollow slotted curtain rod mounted in said groove, drapery carriers and a draw-cord therefor associated with said rod, polygonal sleeves telescopically mounted on the ends of the pole and engaged with said groove for holding them against rotation relatively to said pole, said sleeves adapted to be non-rotatably engaged with said brackets, in positions to cause the said curtain rod to be disposed in either of two diametrically opposite positions relatively to the brackets, sheave carriers movably mounted in at least one of said sleeves, and sheaves over which the said draw-cord is trained mounted in said carriers, said sheaves being varied in position to accord with the variance in position of the curtain rods relatively to the brackets.

8. In a drapery fixture, a pair of supporting brackets, a substantially cylindrical curtain pole having a continuous longitudinal groove, a hollow slotted curtain rod mounted in said groove, drapery carriers and a draw-cord therefor associated with said rod, polygonal sleeves telescopically mounted on the ends of the pole and engaged with said groove for holding them against rotation relatively to said pole, said sleeves adapted to be non-rotatably engaged with said brackets, in positions to cause the said curtain rod to be disposed in either of two diametrically opposite positions relatively to the brackets, sheave carriers movably mounted in at least one of said sleeves, and sheaves over which the said draw-cord is trained mounted in said carriers, said sheaves being automatically varied in position to accord with the variance in position of the curtain rods relatively to the brackets.

9. In a drapery fixture, the combination with supporting brackets having polygonal recesses, of a curtain pole normally rotatable in said recesses and having a continuous longitudinal groove, a curtain rod mounted in said groove and adapted to be positioned at the top, bottom or a side of said pole, and polygonal devices on said pole operatively engaged in the groove thereof and in the recesses of said brackets for holding the pole in any one of the several positions for maintaining the said curtain rod in one of the several positions aforesaid.

10. In a drapery fixture, the combination with supporting brackets having polygonal recesses, of a curtain pole normally rotatable in said recesses, a curtain rod mounted on said pole and adapted to be disposed at the top, bottom or a side of said pole when the latter is supported by said brackets, and polygonal members non-rotatably engaged with said pole and adapted to engage in the recesses of said brackets to maintain the pole positioned to effect any one of the aforesaid several positionings of the said rod.

11. In drapery fixture, the combination with supporting brackets having polygonal recesses, of a curtain pole normally rotatable in said recesses, a curtain rod mounted on said pole and adapted to be disposed at the top, bottom or a side of said pole when the latter is supported by said brackets, and polygonal members non-rotatably engaged with said pole and adapted to engage in the recesses of said brackets to maintain the pole positioned to effect any one of the aforesaid several positionings of the said rod, and projections on said members adapted to engage opposed side faces of the brackets for holding the pole against longitudinal movement relatively to the brackets.

12. In a drapery fixture, the combination with supporting brackets having polygonal recesses, of a curtain pole normally rotatable in said recesses and having a continuous longitudinal groove, a curtain rod mounted in said groove and adapted to be positioned at the top, bottom or a side of said pole, and polygonal devices on said pole operatively engaged in the groove thereof and in the recesses of said brackets for holding the pole in any one of the several positions for maintaining the said curtain rod in one of the several positions aforesaid, and projections on said members adapted to engage opposed side faces of the brackets for holding the pole against longitudinal movement relatively to the brackets.

13. In a drapery fixture, a pair of supporting brackets, a curtain pole normally rotatable in said brackets, a hollow curtain rod mounted upon said pole and adapted to be positioned at the top, bottom, front or rear of the same, slidable drapery carriers mounted on said rod, a draw-cord associated with said carrier and disposed within said rod, devices non-rotatably engaged with said pole and said brackets for holding the pole non-rotatable relatively to said brackets for maintaining said rod in any one of several of the aforesaid positions, sheaves in said devices over which the draw-cord is trained, and stop formations on said devices for engagement with the brackets to hold the pole against longitudinal movement relatively to the brackets.

14. In a drapery fixture, a pair of supporting brackets, a curtain pole normally rotatable in said brackets, a hollow curtain rod mounted upon said pole and adapted to be positioned at the top, bottom, front or rear of the same, slidable drapery carriers mounted on said rod, a draw-cord associated with said carrier and disposed within said rod, devices non-rotatably engaged with said pole and said brackets for holding the pole non-rotatable relatively to said brackets for maintaining said rod in any one of several of the aforesaid positions, sheaves in said devices over which the draw-cord is trained, and stop formations on said devices for engagement with the brackets to hold the pole against longitudinal movement relatively to the brackets, and movable carriers for said sheaves adapted to automatically dispose said sheaves in proper position relatively to the rod as the position of the latter is varied relatively to the said brackets.

15. In a drapery fixture, the combination with supporting brackets having polygonal recesses, of a curtain pole normally rotatable in said recesses, polygonal devices on said pole operatively engaged in the groove thereof and in the recesses of said brackets for holding the pole in any one of the several positions for maintaining the said curtain rod in one of the several positions aforesaid, a curtain rod mounted on said pole and adapted to be disposed at the top, bottom or a side of said pole when the latter is supported by said brackets, and polygonal members non-rotatably engaged with said pole and adapted to engage in the recesses of said brackets to maintain the pole positioned to effect any one of the aforesaid several positionings of the said rod detachably and non-rotatably engaged therewith and in the recesses of said brackets, an end wall for each of said devices having a central opening, a yoke within and spaced from said end wall of each of said devices and having a threaded opening axially aligned with the opening in the end wall, extension members for the curtain pole each having a central threaded projection for passage through the end wall and engagement in the threaded opening of the yoke of each of said devices, said end wall and yoke being capable of flexion to permit of adjustment of the extension members.

16. A curtain or drapery suspension fixture comprising a curtain pole provided in its surface with a continuous longitudinal groove, means mounted within said groove and of less length than the latter affording a track for engaging slidable drapery suspension devices with said pole, a pair of supporting brackets for said pole, and cooperating means on the latter and said brackets partly associated with said groove in said pole for maintaining said first-named means in any one of several positions with respect to the vertical and horizontal diametric planes of the longitudinal axis of the pole.

17. A curtain or drapery suspension fixture including a curtain pole provided in its surface with a longitudinal groove, a conventional curtain rod of substantially C-shaped cross section mounted in and substantially filling said groove and presenting a longitudinal slot at the mouth of said groove, said rod affording means for slidably associating drapery suspension devices with said pole, supporting brackets for said pole, and cooperating means on the latter and said brackets and associated with said groove in said pole for maintaining the latter in any one of a plurality of positions relatively to said brackets to cause the diametric plane of the longitudinal axis of the pole which intersects the longitudinal axis of said rod to be either vertically or horizontally disposed.

CHARLES W. KIRSCH.